United States Patent

[11] 3,567,022

| [72] | Inventors | Donald I. Thornton<br>Warwick;<br>Martin Mahdesyan, Pawtucket, R.I.; Earl<br>S. Yeo, Attleboro, Mass. |
|---|---|---|
| [21] | Appl. No. | 827,861 |
| [22] | Filed | May 26, 1969 |
| [45] | Patented | Mar. 2, 1971 |
| [73] | Assignee | Fram Corporation<br>Providence, R.I. |

[54] FILTER WITH RELIEF AND CHECK VALVES
5 Claims, 2 Drawing Figs.

[52] U.S. Cl. .................................................. 210/130,
210/136, 210/440, 210/443
[51] Int. Cl. ............................................. B01d 35/14,
B01d 27/10
[50] Field of Search ........................................ 210/130,
132, 133, 136, 440, 443, 457 (T.O.), 4 (P.F.-FF),
(Digests)

[56] References Cited
UNITED STATES PATENTS

| 3,305,095 | 2/1967 | Hathaway..................... | 210/130 |
|---|---|---|---|
| 3,332,554 | 7/1967 | Humbert, Jr. ................ | 210/130 |

FOREIGN PATENTS

| 683,247 | 3/1964 | Canada ........................ | 210/130 |

*Primary Examiner*—Frank A. Spear, Jr.
*Attorney*—W. R. Hulbert

ABSTRACT: Relief valve in a filter, with a seating surface adjacent an opening in the valve seat, and a flexible valve member having a portion fixed and sealed relative to the seat on the side of the opening opposite the seating surface, the flexible member being resiliently biased against the seating surface at its free portion.

PATENTED MAR 2 1971 3,567,022

FILTER WITH RELIEF AND CHECK VALVES

This invention relates to filtering.

Objects of the invention are to provide reliable, simple, and inexpensive relief and antidrain valving at the inlet end of a standard filter assembly employing an outside-in tubular filter element, with a minimum number of easily assembled parts that operate properly over the entire range of normal conditions.

The invention features in one aspect a relief valve seat with an opening therethrough and a seating surface adjacent and raised above the plane of the opening; and a flexible valve member having a portion fixed and sealed relative to the seat on the side of the opening opposite the seating surface, and resiliently biased against the seating surface at its free portion. In preferred embodiments the fixed portion of the valve member contacts the plane of the opening and is radially outward of the opening; the seating surface is provided by a rib adjacent a central outlet through the valve seat, so that an annular space of wedge-shaped cross section is provided between the valve member and the plane of the opening when the relief valve is closed; and the valve member is elastomeric and biased against the seating surface by a coil spring acting through a generally flat, rigid plate having a central cylindrical spring guide; whereby, when the valve is closed, the flexible valve member is at an angle to the plane of the plate, and is sandwiched at its free portion between the plate and the rib.

In another aspect the invention features a relief valve housing provided with a generally annular resilient extension which normally biases an antidrain valve in its closed position. In preferred embodiments the antidrain valve member is a flexible, flat member, a radially interior portion of which acts as a relief valve member, the valve member being sandwiched between the relief valve housing and seat, the housing being stepped and welded at a surface parallel to the seat to projections of the seat that extend through the valve member; and the antidrain portion of the valve member provides, at its outer periphery and in its closed position, a seal against the plate through which the filter inlet openings pass, the seal being radially outward of the inlet openings.

In yet another aspect the invention features a valve member the inner portion of which cooperates with a relief valve seat to provide a relief valve, and the outer portion of which cooperates with the filter inlet to provide an antidrain valve, the valve member being flat prior to installation.

In yet another aspect the invention features a relief valve seat with an opening therethrough and a seating surface; and a flexible valve member having a first portion fixed and sealed relative to the seat at the side of the opening opposite the seating surface and a second portion resiliently biased against the seating surface to resist normal fluid pressure when the filter element is unclogged, the flexible member being flat prior to installation.

Other objects, features, and advantages of the invention will be apparent from the following description of a preferred embodiment thereof, taken together with the drawings thereof, in which.

Figure 2:
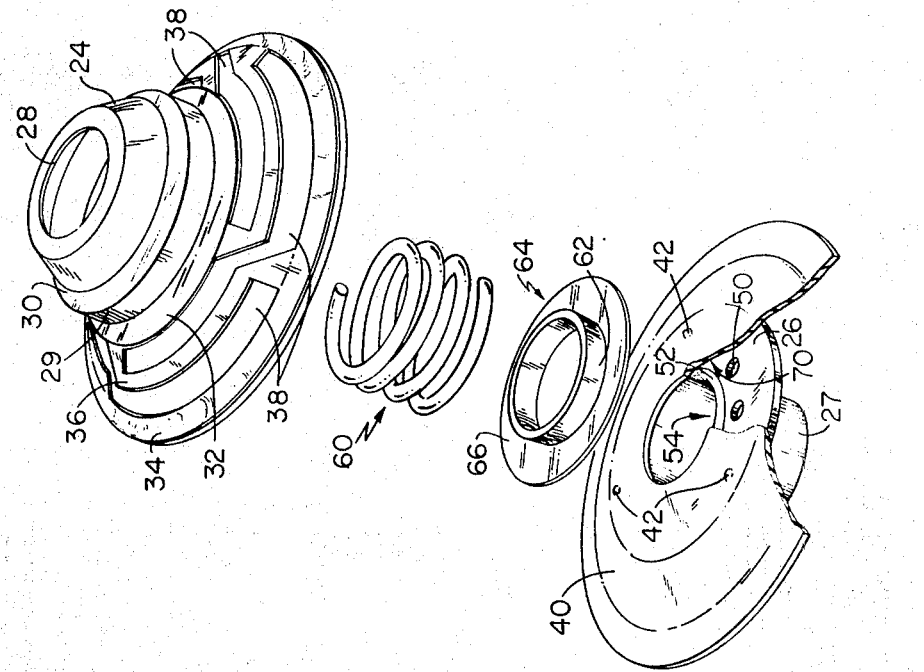
FIG. 2 is an exploded perspective view showing elements of the relief and antidrain valves of FIG. 1.
Figure 1:
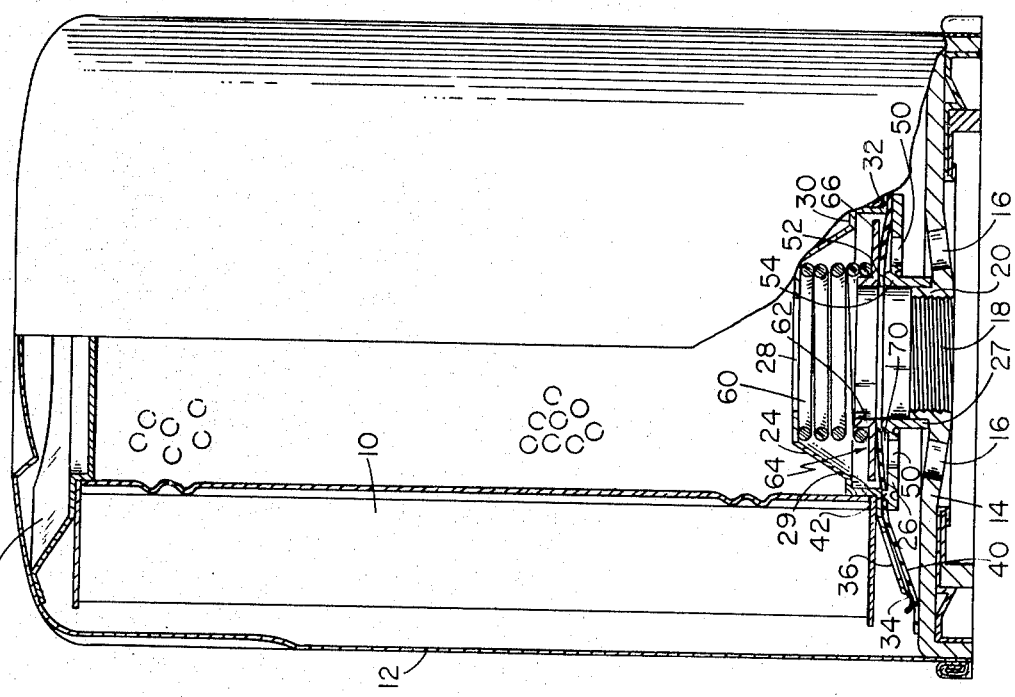
FIG. 1 is a view partially in section of a filter assembly.

Referring to FIG. 1, standard annular pleated paper automotive oil filter element 10 is mounted in generally cylindrical housing 12 having at its inlet end a heavy plate 14 with a ring of inlet openings 16 surrounding a central outlet 18 provided by an internally threaded cylindrical extension 20. Filter element 10 extends between resilient sheet metal retainer 22 and sheet metal relief valve housing 24 which is in turn supported by relief valve seat 26, cylindrical extension 27 of which fits around extension 20.

Relief valve housing 24 has a central opening 28 aligned with outlet 18, is stepped to provide cylindrical wall 29 between oppositely extending annular portions 30 and 32, and extends at 36 obliquely from portion 32 to terminate at its outer periphery with rolled rib 34. Filter element 10 surrounds wall 29 to seat against portion 32. Extension 36 of housing 24 has cutouts 38 for resiliency and acts as a spring for annular elastomeric antidrain valve member 40. Valve member 40 is sandwiched between seat 26 and housing portion 32 which is welded to projections 42 of the seat that pass through the valve member. The valve member extends radially outward beneath and beyond spring extension 36, and radially inwardly, over a ring of eight equally spaced valve openings 50 in seat 26, to adjacent seating surface 52 of annular rib 54 at the I.D. of seat 26. Rib 54 extends about 0.025 inches—0.035 inches above the plane of opening 50, and is rounded with a radius of 0.050 inches.

Coil spring 60 fits at one end around cylindrical extension 62 of valve plate 64, annular planar portion 66 of which is parallel to the plane of openings 50 and has an O.D. slightly less than the I.D. of surrounding cylindrical wall 29. The other end of spring 60 bears against the top of housing 24.

In operation, oil enters under pressure through openings 16, raises the outer portion of valve member 40 against the force of spring extension 36 which normally otherwise holds the valve member against plate 14, fills housing 12 outside element 10, and passes through element 10 and then through opening 28 and outlet 18. Spring extension 36 and valve member 40 prevent back-drainage of oil through inlets 16 when the engine or oil pump stops running. Under normal conditions the pressure differential across element 10 (and hence across plate 64) will be insufficient to compress spring 60, which holds plate 64 against valve member 40 to seal the latter tightly against rib 54, thereby preventing flow through openings 50. With the relief valve thus closed, valve element 40 is tangent to surface 52, and a space 70 of wedge-shaped cross section is provided between the valve element and the plane of openings 50, so that fluid pressure will be exerted against the valve element even at its surface portions not aligned with openings 50, as is desirable for enabling quick opening of the relief valve, without flutter, upon clogging of the filter.

Should element 10 become clogged, the pressure differential thereacross will rise until valve element 40 and plate 64 are raised, compressing spring 60, and oil will flow through openings 50 directly to outlet 18, bypassing the filter element 10.

Other embodiments will occur to those skilled in the art and are within the following claims.

We claim:

1. A relief valve for a filter assembly in which an outside-in tubular filter element is mounted in a housing having a fluid inlet and a central fluid outlet at one end, comprising:
   a valve seat mounted at said one end of said filter element, said seat having;
   an opening therethrough; and
   a seating surface adjacent said opening;
   a flexible valve member having a portion resiliently biased against said seating surface to resist normal fluid pressure when said filter element is unclogged; and
   a generally flat, rigid movable plate mounted adjacent said valve member and through which said valve member is biased, said plate having a main portion parallel to said plane of said opening and an extension providing a guide for a coil spring, said spring acting to so bias said valve member.

2. A relief valve for a filter assembly in which an outside-in tubular filter element is mounted in a housing having a fluid inlet and a central fluid outlet at one end, comprising:
   a valve seat mounted at said one end of said filter element, said seat having;
   an opening therethrough;
   a seating surface spaced from the plane of said opening in the direction away from said one end; and
   a flexible valve member having a first portion fixed and sealed relative to said seat at the side of said opening opposite said seating surface and a second portion resiliently biased against said seating surface to resist normal fluid pressure when said filter element is unclogged; and a valve housing having a resilient portion acting to bias in a closed position an antidrain valve of said assembly.

3. The valve of claim 2 wherein said housing is generally cylindrical with an outer annular portion comprising said resilient portion.

4. The valve of claim 3 wherein said annular portion has a rib adjacent its outer periphery in contact with said antidrain valve.

5. A relief valve for a filter assembly in which an outside-in tubular filter element is mounted in a housing having a fluid inlet and a central outlet at one end, comprising:

a relief valve seat mounted at said one end of said filter element;

a housing having a generally annular resilient extension which normally biases an antidrain valve in its closed position; and a flexible member sandwiched between said housing and said relief valve seat, the innner portion of which cooperates with said relief valve seat to provide said relief valve and the outer portion of which is said antidrain valve, said housing being stepped and welded at a surface parallel to said seat to projections of the seat that extend through the flexible member.